United States Patent
Jiang et al.

(10) Patent No.: US 6,711,710 B2
(45) Date of Patent: Mar. 23, 2004

(54) ROBUST CARRIER IDENTIFYING METHOD AND APPARATUS FOR BANDWIDTH-ON-DEMAND (BOD) SYSTEM

(75) Inventors: Yimin Jiang, Rockville, MD (US); Robert Richmond, Gaithersburg, MD (US); Farhad Verahrami, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 539 days.

(21) Appl. No.: 09/735,675

(22) Filed: Dec. 13, 2000

(65) Prior Publication Data

US 2002/0021721 A1 Feb. 21, 2002

Related U.S. Application Data

(60) Provisional application No. 60/218,974, filed on Jul. 17, 2000.

(51) Int. Cl.[7] .............................................. H03M 13/00
(52) U.S. Cl. ....................................................... 714/784
(58) Field of Search ................................ 714/784, 786, 714/790, 774; 370/320; 375/143; 455/182.1

(56) References Cited

U.S. PATENT DOCUMENTS 5,963,557 A * 10/1999 Eng ............................ 370/432
6,173,164 B1 * 1/2001 Shah ........................ 455/182.1

* cited by examiner

*Primary Examiner*—Albert Decady
*Assistant Examiner*—Shelly A Chase
(74) *Attorney, Agent, or Firm*—John T. Whelan; Michael Sales

(57) ABSTRACT

An approach for identifying a particular carrier among a plurality of carriers in a satellite communication system is disclosed. A transmitter multiplies an encoded signal by a prescribed periodic sequence to form a watermarked signal and transmits the watermarked signal associated with a particular carrier over a communication channel. A receiver tunes to one of the carriers and extracts a data sequence from the one carrier. The receiver multiplies the data sequence with the prescribed periodic sequence to form another watermarked signal and determines whether the watermarked signals match.

27 Claims, 11 Drawing Sheets fec_oos: FEC out of sync, from channel error monitor module

ROBUST CARRIER IDENTIFYING METHOD AND APPARATUS FOR BANDWIDTH-ON-DEMAND (BOD) SYSTEM

This application claims the benefit of priority under 35 U.S.C. §119(e) to U.S. Provisional Application Ser. No. 60/218,974, filed on Jul. 17, 2000.

BACKGROUND OF THE INVENTION

1. Field of the Invention

The present invention relates to radio communication systems, and is more particularly related to identifying a carrier signal in a satellite communication system.

2. Discussion of the Background

Modern satellite communication systems provide a pervasive and reliable infrastructure to distribute voice, data, and video signals for global exchange and broadcast of information. These satellite communication systems have emerged as a viable option to terrestrial communication systems for carrying Internet traffic as well as telephony traffic. Another popular application is direct television broadcasting, which has provided a competitive alternative to cable television systems. Irrespective of the application, a satellite communication system must be designed to support the largest possible traffic capacity, which can translate to lower cost per telephone circuit, or television service, for example, and thus, to increased revenue for the network operator. In addition, satellite communication systems are required to exhibit user response times that are comparable to competing terrestrial systems. That is, the hosts that connect to a satellite terminal (ST) demand that the delay of the satellite system be minimized, thereby reducing user response time.

In recognition of the need to maximize satellite capacity, network operators have deployed various techniques to optimize protocol efficiency. Towards this end, high-speed continuous-mode satellite modems have been deployed; these continuous-mode satellite modems do not use delimiters or the like to separate data frames. For proper operation of the satellite system, it is necessary to distinguish a desired carrier from n identical adjacent carriers in the presence of frequency uncertainties at the receiver. These frequency uncertainties introduce frequency spacings that are greater than the spacing between the desired and adjacent carriers. Many factors contribute to the frequency uncertainties in satellite communication systems, such as the transmitter oscillator, satellite transponder, low-noise-block converter (LNB), and the receiver tuner. The frequency uncertainty could be quite significant in the down-converted signal, especially at low data rates. As a result, a satellite modem may demodulate the wrong carrier. For burst-mode communication, different unique words (UW) in the burst preamble can be applied to identify different carriers. However in continuous-mode communication, use of such unique words presents undesirable overhead, thereby requiring additional bandwidth beyond that necessary to transmit the actual data. The extra transmission bandwidth requirement is prohibited under certain scenarios, in which the bandwidth of each user is pre-allocated. Thus, it is desirable to provide carrier identification functionality without consuming precious additional bandwidth sacrificing performance (bit error rate (BER) and acquisition time), or adding delay uncertainty in the receiver demodulation-decoding chain. Such delay uncertainty in the receiver may cause synchronization problems in network.

One conventional approach to carrier identification employs a small interleaver (i.e., shuffler) between the convolutional encoder and a shaping filter in the transmitter, in which a deinterleaver is applied before a Viterbi decoder in the receiver, using a synchronization flag (denoted as "sync") from the Viterbi decoder to adjust the de-interleaving state. A different interleaving scheme is derived for different adjacent carrier. The drawbacks with this approach are that the complexity of the hardware is increased and the de-interleaving delay is unpredictable.

Based on the foregoing, there is a clear need for improved approaches to distinguishing a wanted carrier from multiple adjacent carriers in the presence of frequency uncertainties within the receiver of a radio communication system.

There is also a need to minimize hardware modifications of presently available modems.

There is also a need to detect the wanted carrier without utilizing overhead bits, thereby not requiring additional system bandwidth.

There is also a need to avoid the introduction of delay in the demodulation and decoding process.

There is also a further need to minimize additional acquisition time during the modem acquisition operation.

Therefore, an approach for performing carrier identification using a more efficient algorithm is highly desirable.

SUMMARY OF THE INVENTION

According to one aspect of the invention, a method is provided for identifying a particular carrier among a plurality of carriers. The method includes multiplying an encoded signal by a prescribed periodic sequence to form a watermarked signal. In addition, the method encompasses transmitting the watermarked signal associated with the particular carrier over a communication channel. The method further includes tuning to one of the carriers, extracting a data sequence from the one carrier, multiplying the data sequence with the prescribed periodic sequence to form another watermarked signal, and determining whether the watermarked signals match. This approach advantageously minimizes hardware modifications to legacy modems.

According to another aspect of the invention, a transmitting device for generating a plurality of carriers comprises a forward error control (FEC) encoder that is configured to code data bits from a data terminal equipment (DTE) to output an encoded signal. A puncturing/carrier identification encoding logic is configured to multiply the encoded signal by a prescribed periodic sequence to form a watermarked signal, to puncture the encoded signal according to a puncturing scheme, and to synchronize the prescribed periodic sequence with the puncturing scheme. A modulator is configured to modulate the watermarked signal. The above arrangement advantageously provides support of multiple carriers without requiring additional system bandwidth.

According to another aspect of the invention, a receiving device for receiving a plurality of carriers comprises a tuner that is configured to tune to one of the plurality of carriers. A demodulator is configured to extract a data sequence from the one carrier. A carrier identification (ID) module is configured to multiply the data sequence with a prescribed periodic sequence to form a watermarked signal. The carrier ID module provides a feedback signal to the tuner to control selection of the plurality of carriers. A forward error control (FEC) decoder is configured to decode selectively the watermarked signal. The above arrangement advantageously avoids the introduction of delay in the demodulation and decoding process.

According to another aspect of the invention, a communication system utilizing a plurality of carriers in a continuous-mode modem comprises a transmitter that is configured to multiply an encoded signal by a prescribed periodic sequence to form a watermarked signal and to transmit the watermarked signal associated with a particular carrier over a communication channel. A receiver is configured to tune to one of the carriers and to extract a data sequence from the one carrier. The receiver multiplies the data sequence with the prescribed periodic sequence to form another watermarked signal and determines whether the watermarked signals match. The above arrangement advantageously performs carrier identification efficiently.

According to yet another aspect of the invention, a system for identifying a particular carrier among a plurality of carriers comprises means for multiplying an encoded signal by a prescribed periodic sequence to form a watermarked signal. The system also includes means for transmitting the watermarked signal associated with the particular carrier over a communication channel, means for tuning to one of the carriers, means for extracting a data sequence from the one carrier, means for multiplying the data sequence with the prescribed periodic sequence to form another watermarked signal, and means for determining whether the watermarked signals match. Under the above approach, acquisition time during modem acquisition operation is minimized.

In yet another aspect of the invention, a computer-readable medium carrying one or more sequences of one or more instructions for receiving a plurality of carriers is disclosed. The one or more sequences of one or more instructions include instructions which, when executed by one or more processors, cause the one or more processors to perform the step of tuning to one of the plurality of carriers. Another step includes extracting a data sequence from the one carrier. Another step includes multiplying the data sequence with a prescribed periodic sequence to form a watermarked signal. Yet another step includes selectively decoding the watermarked signal. This approach advantageously avoids use of overhead bits to identify carriers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5b is a timing diagram of the system of FIG. 5a;

FIG. 7b is a timing diagram of the FEC FSM of FIG. 7a;

FIG. 8b is a timing diagram of the depuncturer/carrier identifier module of FIG. 8a.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention efficiently provides identification of a specific carrier among multiple carries within a satellite communication system. A forward error control (FEC) encoder codes data bits from a data terminal equipment (DTE) to output an encoded signal. A puncturing/carrier identification encoding logic multiplies the encoded signal by a watermarking sequence to form a watermarked signal; the logic also punctures the encoded signal according to a puncturing scheme, and synchronizes the watermarking sequence with the puncturing scheme. At the receiving end, a tuner tunes to one of the multiple carriers, in which a demodulator extracts a data sequence from the one carrier. A carrier identification module multiplies the data sequence with the watermarking sequence to form a watermarked signal. The carrier ID module provides a feedback signal to the tuner to control selection of the carriers. A forward error control (FEC) decoder selectively decodes the watermarked signal. This arrangement eliminates the need to employ overhead bits for carrier identification purposes, while permitting the use of continuous-mode satellite modems to maximize system capacity.

Although the present invention is discussed with respect to a satellite communication system, the present invention has applicability to other radio communication systems utilizing multiple carriers.

Figure 1:
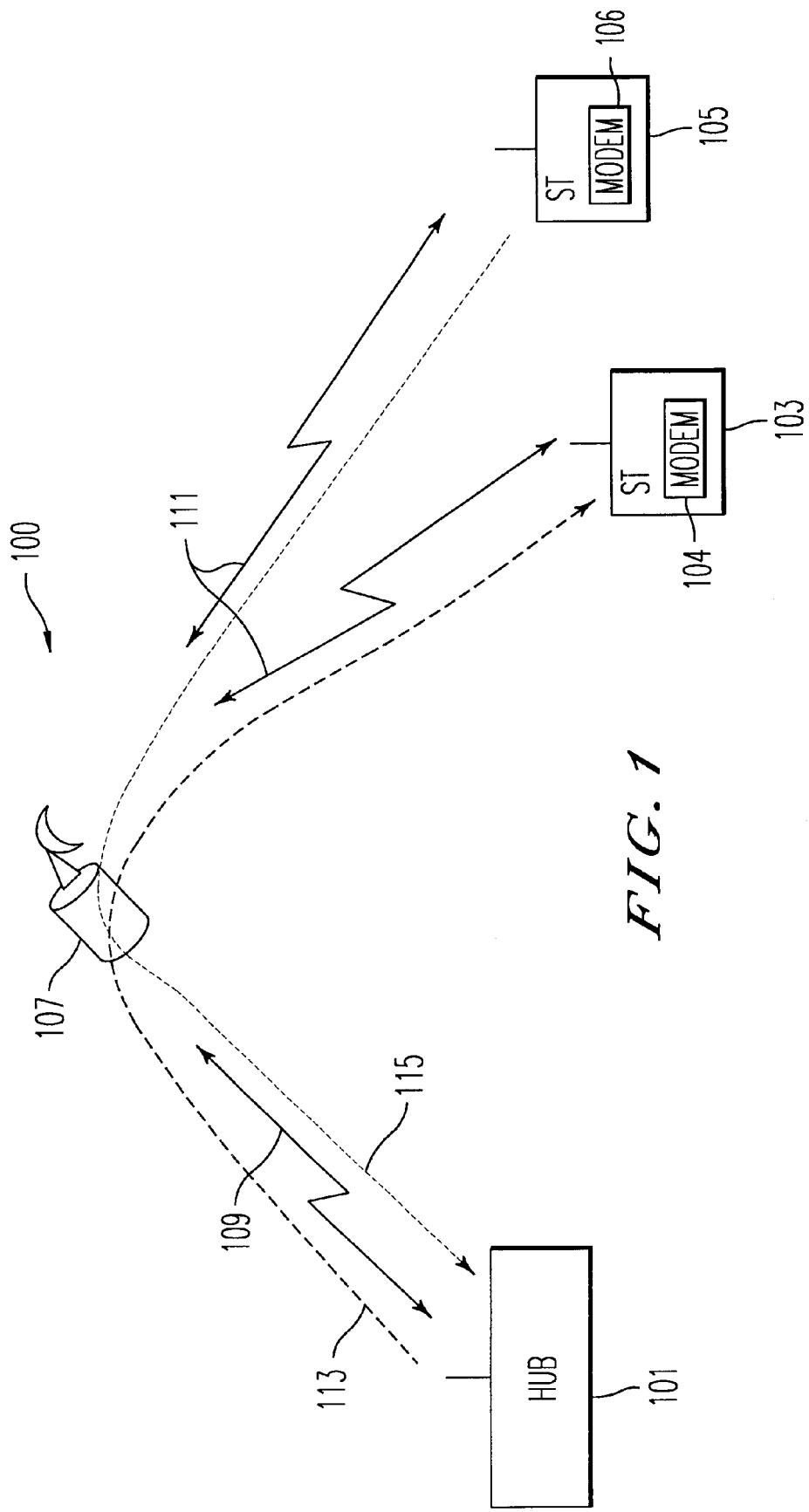
FIG. 1 is a diagram of a satellite communication system utilizing a carrier identification mechanism, according to an embodiment of the present invention.

FIG. 1 shows a satellite communication system utilizing a carrier identification function, according to an embodiment of the present invention. Network operators need to manage satellite capacity efficiently in order to support the large variety of users and applications, and maintain reasonable operational costs. System 100 is a demand-assigned multiple access (DAMA) Bandwidth-on-Demand (BOD) system. The DAMA system 100 allocates the available bandwidth into common bandwidth (BW) pools for use by satellite terminals (STs). The DAMA system 100 provides a single hop satellite transmission network, whereby multiple STs share a limited "pool" of satellite transponder capacity; however, the system 100 can be implemented using multiple hops. As the terminology suggests, the system 100 allocates bandwidth on a demand-assigned basis, wherein the bandwidth is returned to the common pool upon termination of a communication session (or call). In this manner, the transponder of satellite 107 can be shared by numerous STs 103, and 105.

As shown in FIG. 1, satellite communication system 100 includes a hub 101 (or gateway station) that communicates with STs 103 and 105 (or packet data modules (PDMs)) through satellite 107. In an exemplary embodiment, both uplink 109 and downlink 111 operate at C-band (4–8 GHz); alternatively, these links 109 and 111 may use Ku-band (12 GHz to 18 GHz). For the purposes of explanation, a convention is adopted whereby the communication path from hub 113 to the satellite 107 down to an ST, which in this example is ST 103, is denoted as the downlink. Conversely, a communication path 115 from ST 105 up to the satellite 107 and down to the hub 101 is referred to as the uplink. In this example, hub 101 transmits data to the STs 103 and 105, which utilize continuous-mode satellite modems 104, and 106, respectively, to communicate with the hub 101. STs 103 and 105 identify the proper carrier among n adjacent carriers by detecting their respective carrier ID sequence. According to the present invention, the carrier ID sequence is embedded in the data sequence, behaving as a "watermark" of sorts; thus, such a sequence can be termed "a watermarking sequence." The generation of this sequence is more fully described with respect to FIG. 6c.

Although not shown, the satellite communication system 100 may support connectivity to a public switch telephone network (PSTN) and/or a public land mobile network (PLMN) to permit the STs 103 and 105 to communicate with various terrestrial systems via the hub 101.

The gateway station 101 manages and allocates system communication resources that are necessary to support the communication traffic within their respective service areas, such as Ku-(or C-) band spectrum and downlink EIRP (Effective Isotropically Radiated Power). For example, the gateway station 101 can provide the following functions: management of the call set-up and tear down, generation of call records, allocation of communication resources within its service area (frequency and power), user authentication, and support of user roaming within the system coverage area.

A network management system (NMS) (not shown) hosts, according to an exemplary embodiment, the BoD functionality and possesses a bandwidth manager/scheduler (not shown) that is responsible for calling processing and DAMA bandwidth assignment. When a remote user requests a new connection, the NMS allocates a set of channels (transmitter (TX) and receiver (RX)) for the duration of the session. Upon termination of the connection, the channels are returned to the common bandwidth pool for use in other connections. BoD is a service provided over the satellite communication system 100, where the bandwidth available to send and/or receive data can be assigned to meet user requirements, as and when, needed by the user.

The STs 103 and 105 provide the subscriber interface to the system 100. The terminal types may include hand held, vehicular, and stationary units. Hand held terminals resemble traditional ground cellular units, which vehicular terminals include, for example, handsets that are docked to an external antenna, transmit power booster, and DC power source. Stationary terminals are equipped with directional antennas and can be configured to support a number of voice and data circuits. As shown, STs 103 and 105 possess continuous-mode modems 104 and 106, respectively.

Figure 2:
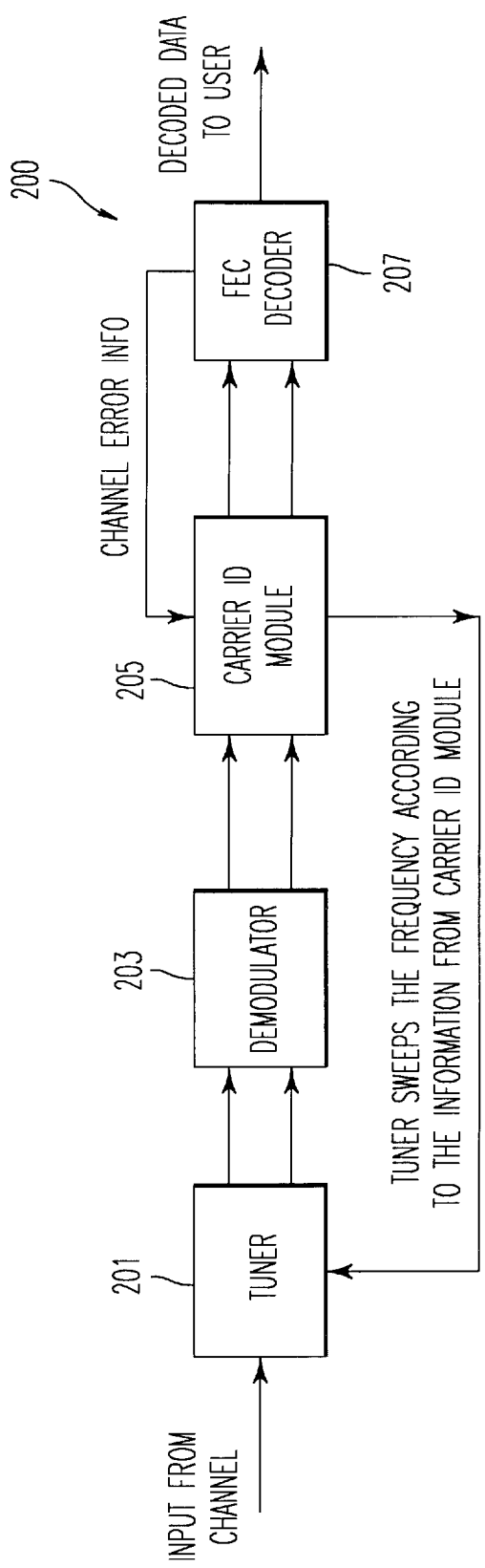
FIG. 2 is a diagram of a receiver that is capable of performing carrier identification (ID), according to an embodiment of the present invention.

FIG. 2 shows a diagram of a receiver that supports carrier identification (ID) functionality, according to an embodiment of the present invention. Receiver 200 is deployed in each of the STs 103 and 105 (FIG. 1) and includes a tuner 201, a demodulator 203, a carrier ID module 205, and a FEC decoder 207. The tuner 201 sweeps the frequency band according to the information from carrier ID module 205 to tune to an input signal. The input signal carries a periodic sequence, which is denoted as watermarking sequence that is unique to a particular carrier. The carrier ID module 205 adjusts its decision using the channel error information from a forward error control (FEC) decoder 207, which, according to an embodiment of the present invention, is a Viterbi decoder. Viterbi decoding is detailed in Viterbi and Omura, "The Principles of Digital Communication and Coding" McGraw-Hill Publishing Co., 1979, pp. 227–287; which is incorporated herein by reference. The data sequence from demodulator 203 is multiplied by the same watermarking sequence that was used at the transmitter side. If the two watermarking sequences match, the Viterbi decoder 207 set a synchronization (sync) flag, for a given acceptable channel error rate. However, if the two sequences do not match, Viterbi decoder does not set the sync flag.

The advantage of the proposed watermarking scheme is that it introduces no delay in the demodulation process and consumes very little hardware in current continuous mode modem settings. The tradeoff between the number of carriers that can be identified simultaneously and the acquisition time presents an important design consideration.

According to an embodiment of the present invention, the watermarking sequence based carrier identifying (ID) algorithm applies to any modulation scheme and coding rate (e.g., convolutional code, or convolutional code concatenated with BCH (Bose Chaudhuri Hocquenghem) code). For the purposes of explanation, it is assumed that the system 100 utilizes QPSK modulation plus rate ¾ convolutional encoding. The rate ¾ convolutional code is generated from a rate ½ mother code using some puncturing scheme. Further, the carrier ID function (i.e., algorithm) can identify five different carriers.

Figure 3:
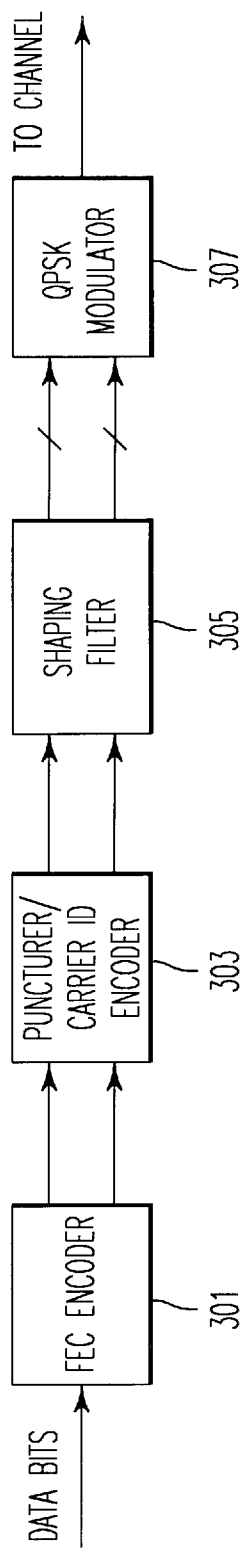
FIG. 3 is a diagram of a transmitter with a carrier ID encoder, according to an embodiment of the present invention.

FIG. 3 is a diagram of a transmitter with a carrier ID encoder, according to an embodiment of the present invention. Transmitter 300 includes a FEC encoder 301, which receives data bits from a user data terminal (DTE) (not shown) and outputs a coded data stream to a puncturer/carrier ID encoder module 303. In an exemplary embodiment, the FEC encoder 301 may employ various coding schemes; e.g., convolutional codes, and Reed-Solomon codes concatenated with a convolutional code. The output from FEC encoder 301 is passed through puncturer/carrier ID encoder module 303, which in turn, sends an output sequence to a shaping filter 305 (i.e., transmit pulse shaping filter) and modulator 307. The modulator 307, in this example, employs QPSK (Quadrature Phase Shift Keying) modulation.

The puncturer/carrier ID encoder module 303 introduces the watermarking sequence into the data bits, operating in similar fashion to a CDMA spread spectrum system. In both CDMA and the watermarking procedure of the present invention, a sequence is multiplied to the original coded sequence. The key difference is that there is no processing gain with the watermarking procedure; i.e., the watermarking sequence has the same rate as that of the coded data sequence. By contrast, in a CDMA system, the rate of a signature sequence is a multiple of that of the coded data sequence; the ratio between the signature sequence rate and coded data rate is called processing gain. Without processing gain, the channel coded random data is mixed with a watermarking sequence. Under this approach, a correlator cannot be used to extract the watermarking sequence. Therefore, hypothesis tests are needed to recover the phase of the watermarking sequence in the receiver side. To reduce the acquisition time (i.e., the number of hypothesis tests), the watermarking sequence should be as short as possible;

however, the longer the watermarking sequence, the more users the system 100 can support. Accordingly, these two considerations, duration of acquisition time, and length of the watermarking sequence, present a design tradeoff in the watermarking sequence design. These design considerations are more fully described later with respect to FIG. 6c.

Figure 4:
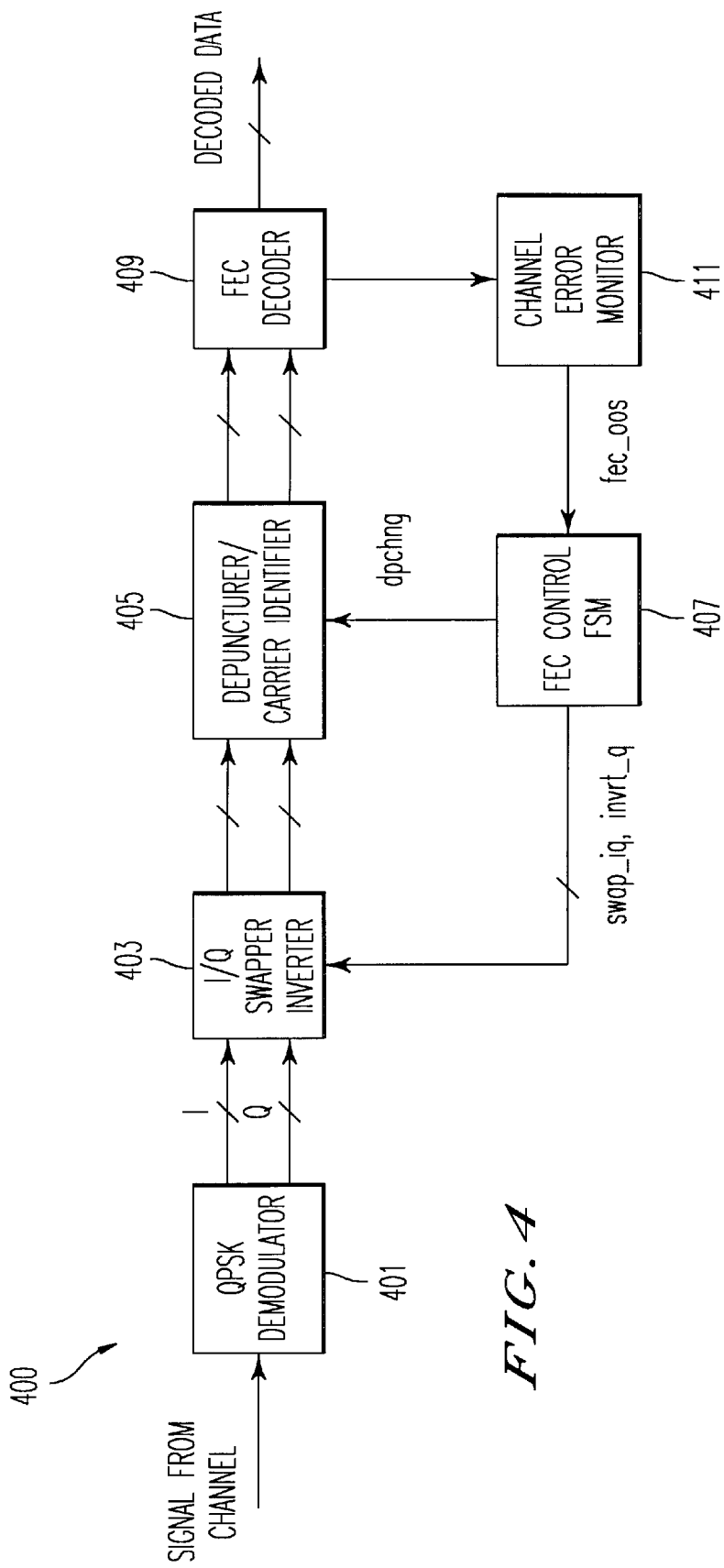
FIG. 4 is a diagram of a receiver with a carrier ID decoder, according to an embodiment of the present invention.

FIG. 4 shows a diagram of a receiver with channel error monitoring capability, according to an embodiment of the present invention. Receiver 400 includes a QPSK demodulator 401 that ouputs to an I/Q swapper inverter 403. The data sequences (3-bit sequences for soft-decision I and Q) from QPSK demodulator 401 are adjusted by the I/Q swapper and inverter 403. A depuncturer/carrier identifier module 405 receives the output from the I/Q swapper inverter 403. A FEC control finite state machine (FSM) 407 generates control signals, swap_iq, invrt_q, and dpchng, to the I/Q swapper inverter 403 and the depuncturer/carrier identifier module 405, respectively. The FEC control FSM 407 coordinates the decoding/de-watermarking process.

The FEC decoder 409, which in this exemplary embodiment is a Viterbi decoder, can detect if a 90-degree phase ambiguity has been incurred in the demodulation process. Consequently, I/Q swapper and inverter 403 is employed to resolve the 90-degree phase ambiguity associated with the FEC decoder 409. The processed sequences are passed through the depuncturer/carrier identifier module 405, which adjusts the depuncturing phase and the relative phase of the watermarking sequence in the receiver 400 according to the "dpchng" signal from FSM.

The output from carrier identifier module 405 is fed into the FEC decoder 409, which decodes the sequence and uses some mechanism, such as syndrome check (for concatenated mode) or comparison of the received bits with a re-encoded version of the decoded bits, to assess the channel bit error rate (BER). If channel error rate exceeds some predetermined threshold (according to the BER performance of demodulator and channel signal to noise ratio (SNR)), a channel error monitor module 411 sends the FSM 407 an out-of-synchronization signal (tec_oos) to inform the FSM 407 to further adjust the depuncturing and the de-watermarking process (i.e., try another state). The FSM 407 uses the channel error rate information from the channel error monitor module 411 to attempt different hypotheses.

Figure 5A:
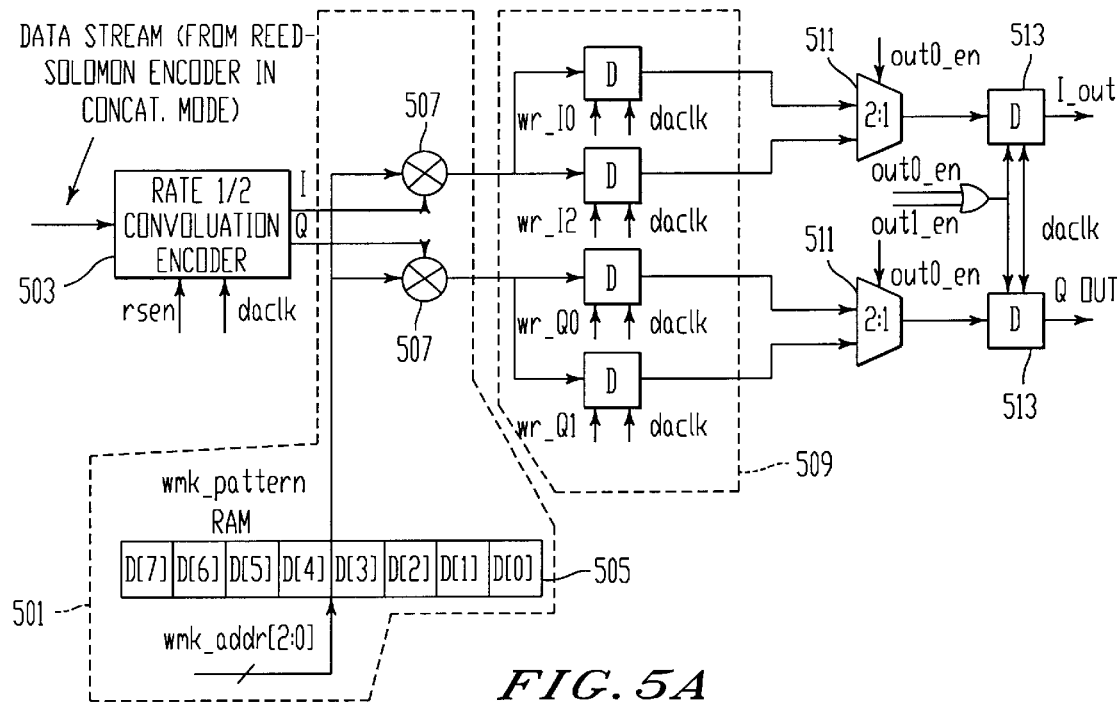
FIG. 5a is a diagram of puncturer/carrier ID encoder module, in accordance with an embodiment of the present invention.
Figure 5B:
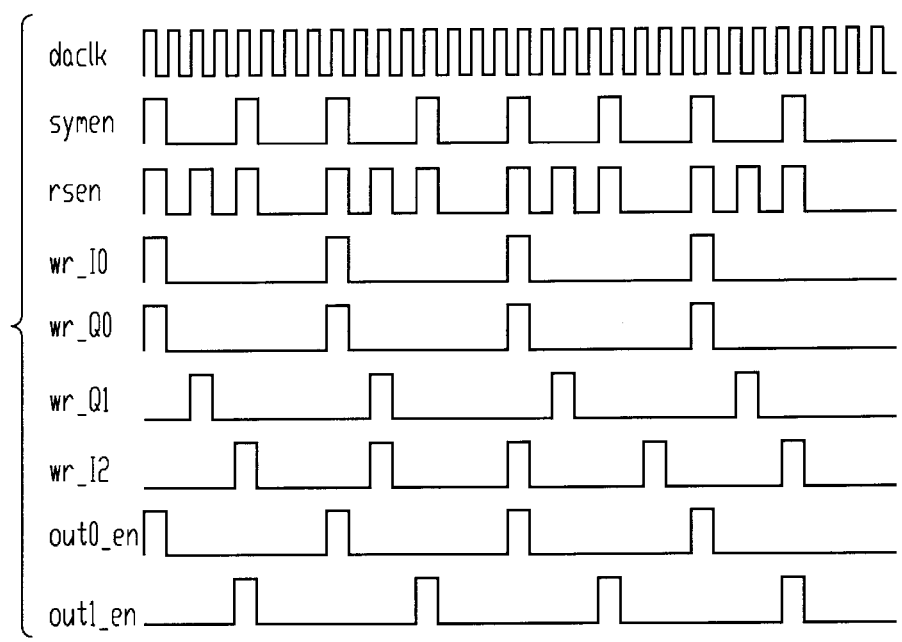
Figure 6A:
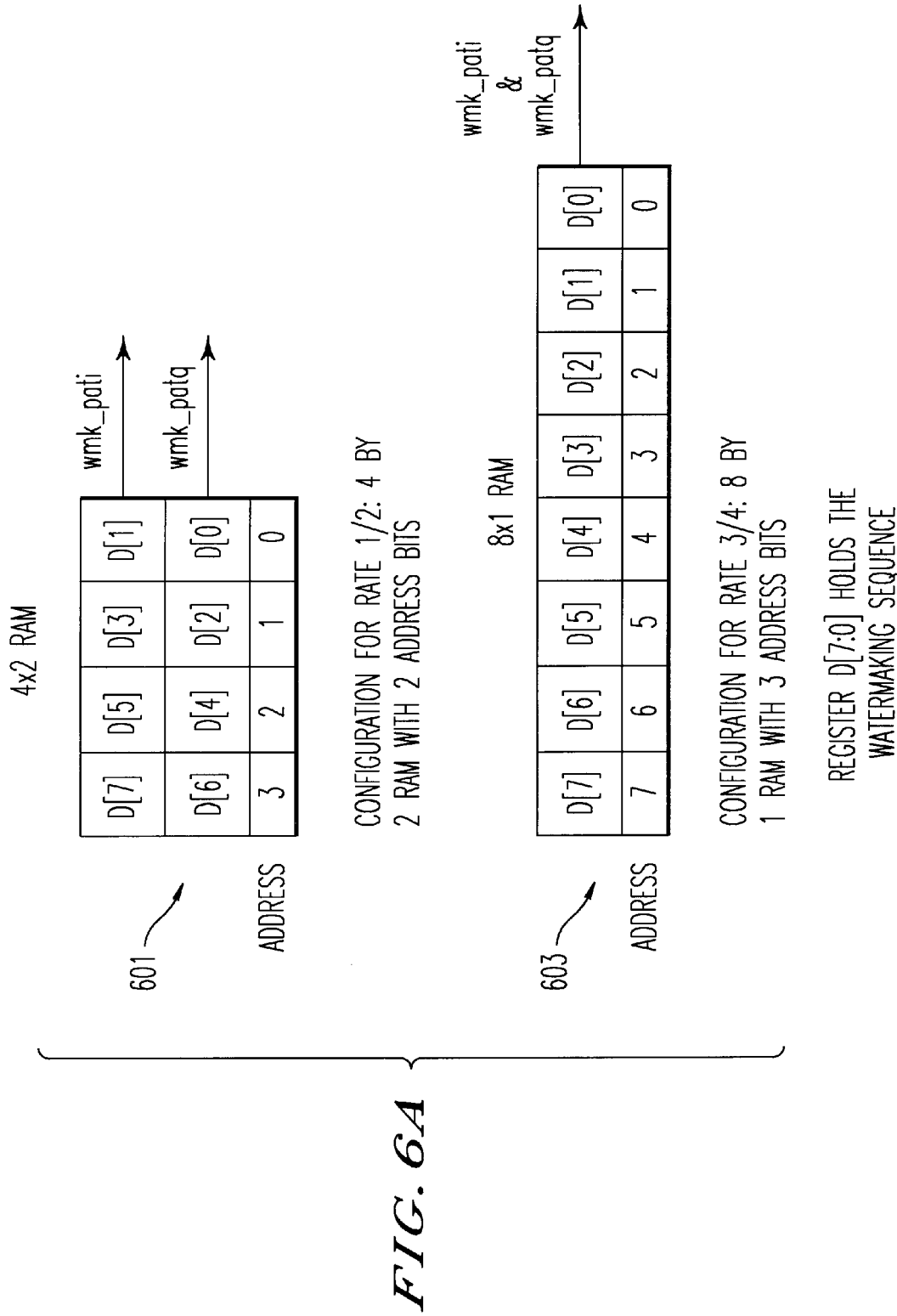
FIG. 6a is a diagram of RAMs (Random Access Memory), which store the watermarking sequence, for rate ¾ and ½ convolutional codes, in accordance with an embodiment of the present invention.

FIGS. 5a and 5b show a block diagram of a puncturer/carrier ID encoder module and associated timing diagram, respectively, in accordance with an embodiment of the present invention. In this example, rate ¾ convolutional code is generated by puncturing the rate ½ mother code; the timing diagram, shown in FIG. 5b, illustrates the puncturing timing sequence. A carrier ID encoder 501 receives a data stream from an FEC encoder 503; in this case, the data stream is a rate ½ convolutional code. The carrier ID encoder 501 includes a RAM 505, which stores the watermarking sequence. RAM 505 has two different configurations for rate ¾ and ½ which is shown in FIG. 6a RAM 505 operates according to the following algorithm:

```
always @ (posedge daclk) begin
    if(wr_i0) begin
        wmk_addr <= wmk_addr + 3'h1;
    end
    else if(wr_i2)
        wmk_addr <= wmk_addr + 3'h1;
    end.
```

The above algorithm, according to one embodiment of the present invention, may be written in Verilog, which is a standard hardware description language that models the behavior of hardware circuits. The watermarking sequence has a period of 8 (bits), whose address in RAM 505 is controlled by the above algorithm (which is a finite state machine), is multiplied via the multipliers 507 on the output from the convolutional encoder 503.

To reduce the number of hypothesis tests and the acquisition time in the receiver, the watermarking sequence is synchronized with the puncturing scheme in the transmitter 300 and receiver 200 by tying the sequence and puncturing states together during reset. Puncturing logic 509 utilizes four flip-flops, which are controlled by signals, wr_I0, wr_I2, wr_Q0 and wr_Q1. The output signals of the puncturing logic 509 are input to multiplexers 511, which is controlled by an output enable signal, out0_en. The multiplexers 511, in turn, feed output signals to flip-flops, 513, which output the I_out signal and the Q_out signal.

The diagram of FIG. 5b shows the relationship between the following signals: symen (symbol enable), resen (shift load enable), wr_I0 (I0 write enable), wr_Q0 (Q0 write enable), wr_I2 (I2 write enable), wr_Q1 (I1 write enable), out0_en (output enable), and out1_en (output enable). The master clock (daclk) is the D/A sampling clock from a timing generator (not shown).

FIG. 6a is a diagram of a RAM that stores the watermarking sequence that has two different configurations for rate ¾ and ½ codes, in accordance with an embodiment of the present invention. RAM 601 is a 4×2 RAM that stores the watermarking sequence and employs 2 bit addressing. Alternatively, RAM 603 is an 8×1 RAM, with 3 bit addressing, to store the watermarking sequence. The watermarking sequence encoding process is shown in FIG. 6b.

Figure 6B:
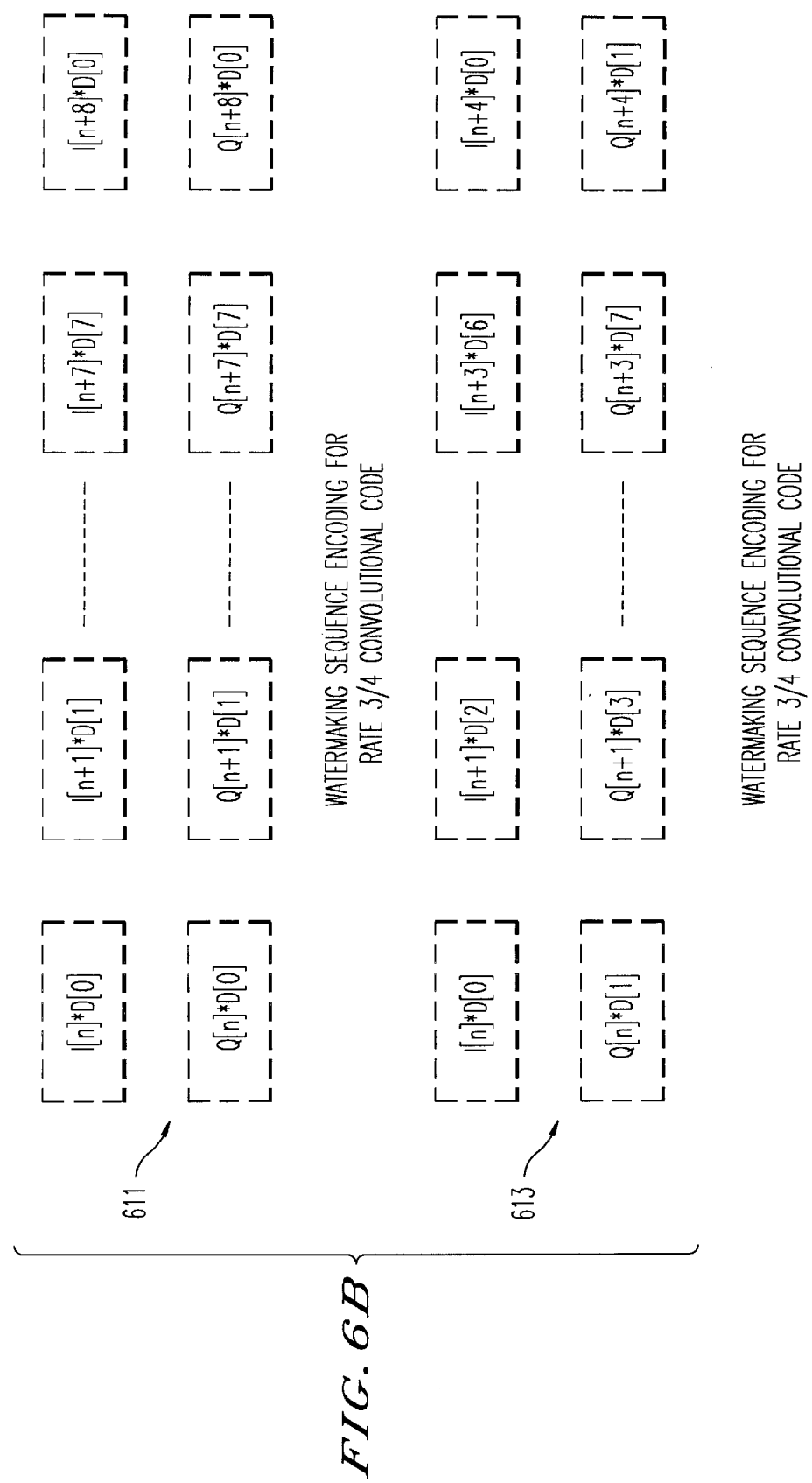
FIG. 6b is a diagram of the watermarking sequence encoding schemes for rate ¾ and ½ convolutional codes, according to an embodiment of the present invention.

FIG. 6b is a diagram of the watermarking sequence encoding schemes for rate ¾ and ½ convolutional codes, according to an embodiment of the present invention. In an exemplary embodiment, an 8-bit watermarking sequence is used, which can accommodate five different carriers. For the rate ¾ coding scheme 611, I and Q data are multiplied by the same watermarking sequence bits; for the rate ½ coding scheme 613, I and Q data are multiplied by different watermarking sequence bits. The generation of the watermarking sequence follows a heuristic procedure, as shown in FIG. 6c.

Figure 6C:
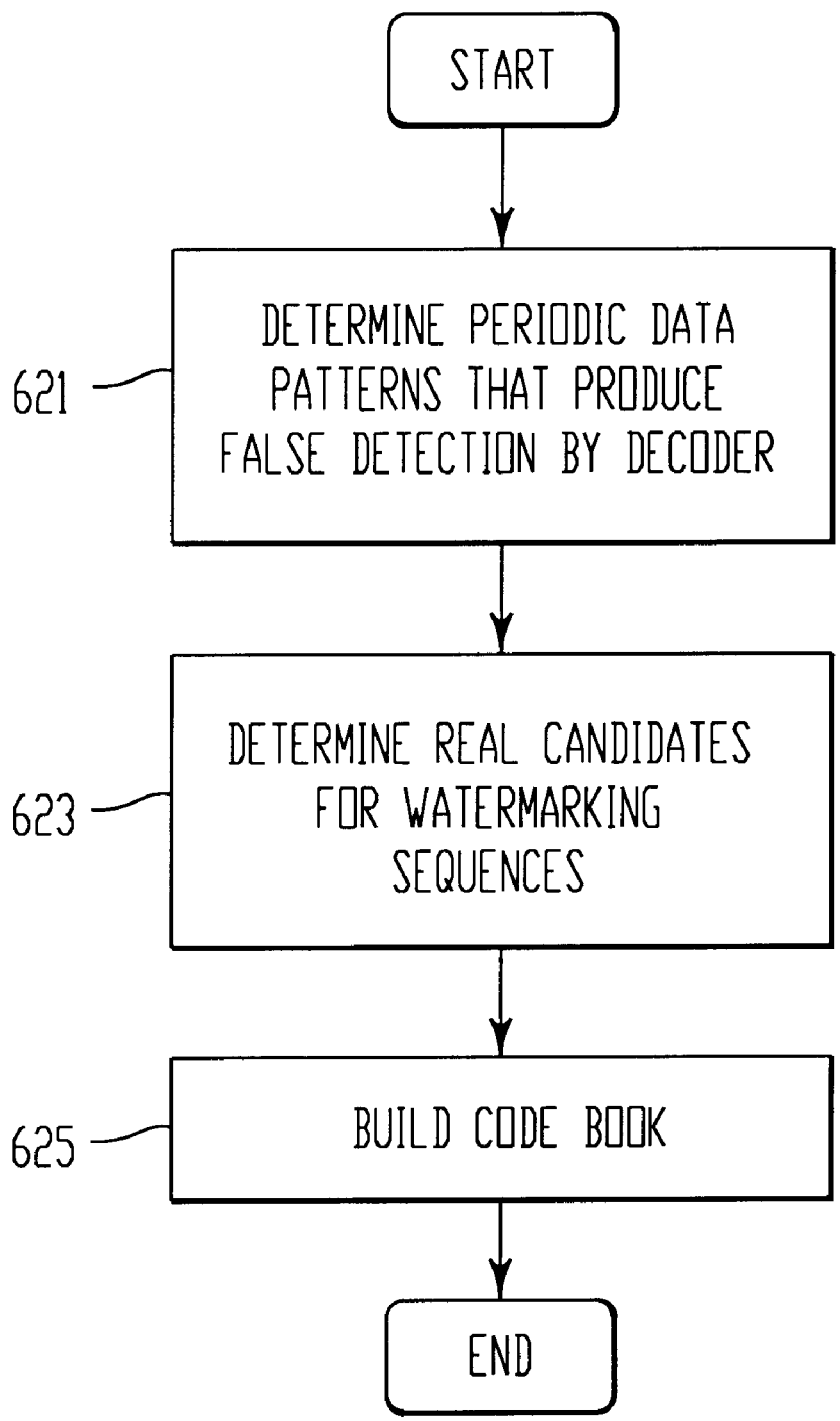
FIG. 6c is a flowchart of the watermarking sequence generation process, in accordance with an embodiment of the present invention.

FIG. 6c is a flowchart of the watermarking sequence generation, in accordance with an embodiment of the present invention. In designing the watermarking sequence, a number of engineering tradeoffs need to be considered: the number of different carriers that need to be identified simultaneously, the acquisition time, and hardware complexity. As mentioned previously, it is evident that a long watermarking sequence can support a greater number of carriers; however, this lengthens the acquisition time. During acquisition, the FSM 407 has to test all the possible hypotheses of the phase of incoming watermarking sequence, more hypotheses are necessary for longer watermarking sequence than for shorter ones.

However, the short sequence increases the probability of false detection (of a wrong carrier) because a short periodic sequence introduces a relatively large "channel bit error rate" to the Viterbi decoder 409. For example, if there is one bit difference between two watermarking sequences of period 8 (one sequence at the in transmitter, the other in the receiver), this difference will introduce 12.5% channel BER, which is quite significant. With a short watermarking sequence, it is highly possible for the watermarking encoding and decoding process to cause the Viterbi decoder 409 to choose a totally different path through the trellises, in which no channel errors are detected. That is, the Viterbi decoder 409 will decode the de-watermarked sequence to another data sequence without even detecting any channel errors through re-encoding and comparing mechanism in the channel error monitor module 411. It should be noted that the possibility of false detection between two different carriers increase dramatically as the total number carriers increases, when the period of watermarking sequence is reduced. Further, false lock (of wrong decoding phase) can occur for the same watermarking sequences in the transmitter 300 and the receiver 400 for certain sequence patterns; this is so because the sequences on both sides are periodic and the correlation (multiplication) with wrong decoding phase between two circularly shifted sequence could make the Viterbi decoder 409 choose the wrong path through the trellis, thereby producing incorrect results from the Viterbi decoder 409. In light of the above observations, the watermarking sequences can be generated using the procedure shown in FIG. 6c.

By way of example, this heuristic procedure is explained with respect to an 8-bit watermarking sequence, which, as indicated above, can support five users. In step 621, the periodic data patterns that produce false detection by the decoder are computed. Specifically, the periodic data patterns (with a period of eight bits) that cause the FEC decoder 409 (FIG. 4), which in an exemplary embodiment is a Viterbi decoder, (for different rates) to decode the wrong trellis without detecting any channel bit errors, are determined. For the purposes of explanation, these data patterns are referred to as "bad" sequences. Computer simulations or hardware tests can be conducted to determine these "bad" sequences. Under this example, the bad sequences for both rate ½ and ¾ convolutional codes are as follows (expressed in hexidemical): 03, 0C, 0F, 30, 33, 3C, 3F, C0, C3, CC, CF, F0, F3, and FC.

After identifying the bad sequences, the candidates for the watermarking sequences, as in step 623, are determined. A candidate is defined as a data pattern that itself as well as its correlation (multiplication) with all of its 2-bit circularly shifted versions are not among the bad sequences. It is noted that there are four 2-bit shifted sequences for an 8-bit sequence. In this example, 212 candidates can be found.

Next, a codebook can be built, as in step 625, based on these 212 candidates, ruling out the bad sequences. In an exemplary embodiment, the codebook is maintained as a 212×212 table, in which the element of the mth row and the nth column is set to 1 if the correlation (multiplication) between candidate m and the 1-bit circularly shifted versions (there are 8 sequences for a candidate) of candidate n is not among the bad sequences; otherwise, the element is set to zero. In this manner, five code words for five different carriers could be selected from this table with the condition that all the cross elements among these five code words are 1 s.

It is recognized by one of ordinary skill in the art that the above approach can be readily modified to accommodate any number of carriers.

Figure 7A:
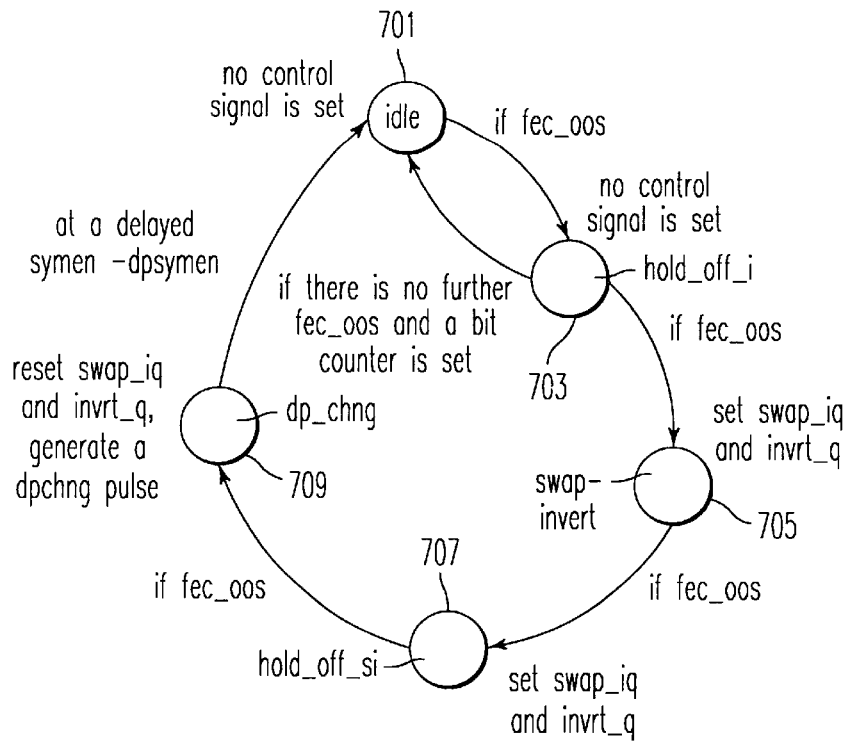
FIG. 7a is a state transition diagram of the Forward Error Correction (FEC) control finite state machine (FSM), according to an embodiment of the present invention.

FIG. 7a is a state transition diagram of the FEC FSM, according to an embodiment of the present invention. Initially, the receiver 400 is in the idle state 701, in which no adjustment is needed. Upon receiving the fec_oos signal from the channel error monitor module 411, the FSM 407 transitions to the hold_off_i state 703—i.e., a waiting state. A bit counter is set to indicate that such a signal has been received. This waiting period ensures that the fec_oos signal was not sent in error; for example, which could have been sent because of a spike in the system. If another fec_oos signal is not received and the bit counter is set, then the FSM 407 returns to the idle state 701. However, if the FSM 407 does receive a subsequent fec_oos signal, then the FSM 407 assumes a swap-invert state 705, which sets the swap_iq and invrt_q signals. The swap_iq signal instructs the I/Q swapper inverter 403 to swap the I and Q signals; the invrt_q signal causes the inversion of the Q signal. These swap_iq and invrt_q signals are sent to remove phase ambiguity, as discussed previously.

If another fec_oos signal is received, then the FSM 407 transitions into another waiting state, hold_off si 707. Again this waiting period is needed to confirm that the fec_oos signal is legitimate. Upon receiving yet another fec_oos signal, then the FSM 407 transitions into the dp_chng (depuncture change) state 709. During this state 709, the depuncturing enable signal (dp_chng) is set, and the swap_iq and invrt_q signals are reset. The dp_chng signal instructs the depuncturer/carrier identifier module 405 to adjust the depuncturing scheme. Thereafter, the FSM 407 returns to the idle state 701.

After a predetermined amount of time, if the FEC decoder 409 is still out of synchronization, a wrong carrier is identified, and the tuner sweeps to another carrier. If FEC decoder 409 is synchronized, then a lock to the intended carrier is declared by the receiver 400.

Figure 7B:
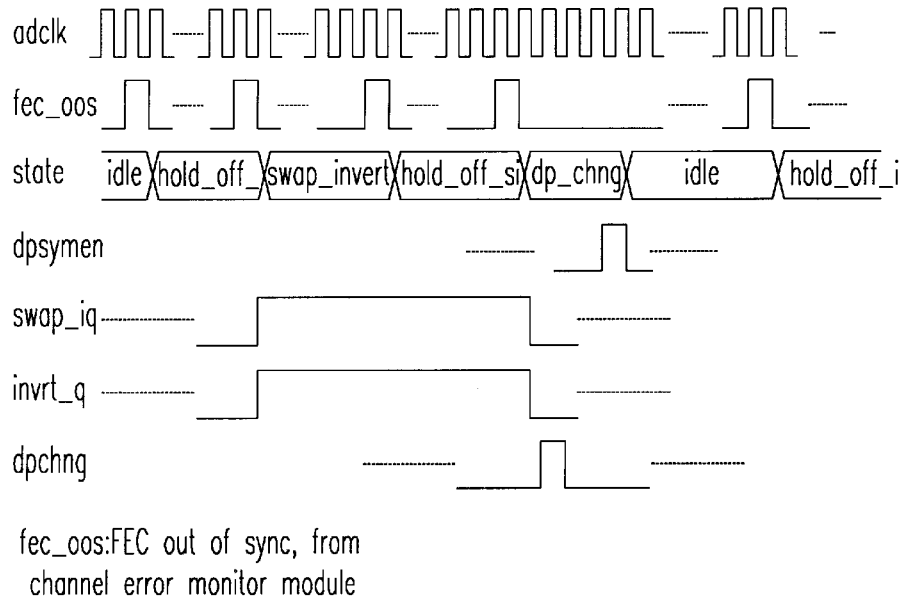

FIG. 7b is a timing diagram of the FEC FSM of FIG. 7a. The three control signals, dpchng, swap_iq, and invrt_q, are shown near the bottom of the diagram. The adclk signal is the A/D sampling clock from a timing generator (not shown).

Figure 8A:
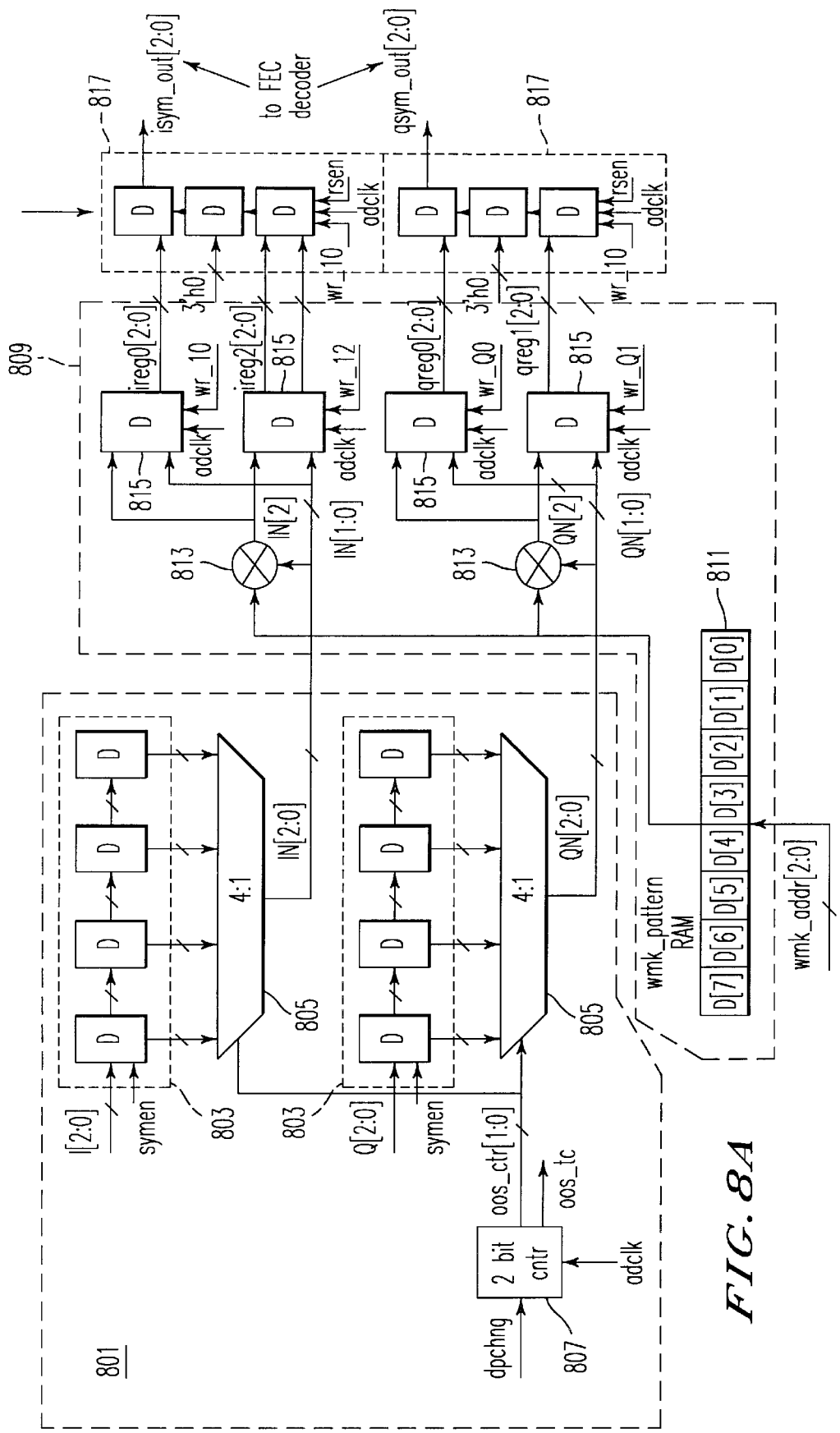
FIG. 8a is a diagram of a hardware implementation of the depuncturer/carrier identifier module, according to an embodiment of the present invention.

FIG. 8a is a diagram of a hardware implementation of the depuncturer/carrier identifier module, according to an embodiment of the present invention. A depuncturing logic 801 includes two four stage buffers 803 for each of the I and Q signals. That is, the four stage buffers 803 store the I and Q data, respectively, from demodulator 401 (FIG. 4). The four stage buffers 803 are connected to multiplexers 805, which are used to select different elements of the buffers 803, according to the output of a 2 bit counter 807 (oos_ctr). If a dp_chng pulse is received from the FSM 407, the counter 807 is incremented by one to adjust the depuncturing phase and watermarking sequence phase.

A carrier identifier logic 809 removes the watermarking sequence by multiplying the sequence back to the data stream. A watermarking sequence RAM 811 stores the same watermarking sequence as that in the transmitter 300 (FIG. 3). The RAM 811 operates according to the following algorithm (Verilog code):

```
always @ (posedge adclk) begin
    if(wr_Q0) begin
        if(wmk_punct_adj)
            wmk_addr <= wmk_addr + 3'h5;
        else
            wmk_addr <= wmk_addr + 3'h1;
    end
    else if(wr_Q1)
        wmk_addr <= wmk_addr + 3'h1;
end.
```

A phase adjustment finite state machine (not shown) adjusts the phase of the watermarking sequence based upon the oos_tc signal from the 2-bit counter 707. The phase adjustment FSM 809 performs the following algorithm (Verilog code):

```
always @ (posedge adclk) begin
    if(oos_tc)
        wmk_punct_adj <= 1;
    else if(wr_Q0)
        wmk_punct_adj <= 0;
end.
```

The carrier identifier logic 809 utilizes multipliers 813 to effectively multiply the watermarking sequence to the I and Q data, which are output from multiplexers 805. The resultant product is stored in flip-flops 815.

Circular shift registers 817, each with three storage elements, outputs the depunctured and de-watermarked sequence to the Viterbi decoder 409. The above configuration advantageously requires minimal hardware modification.

Figure 8B:
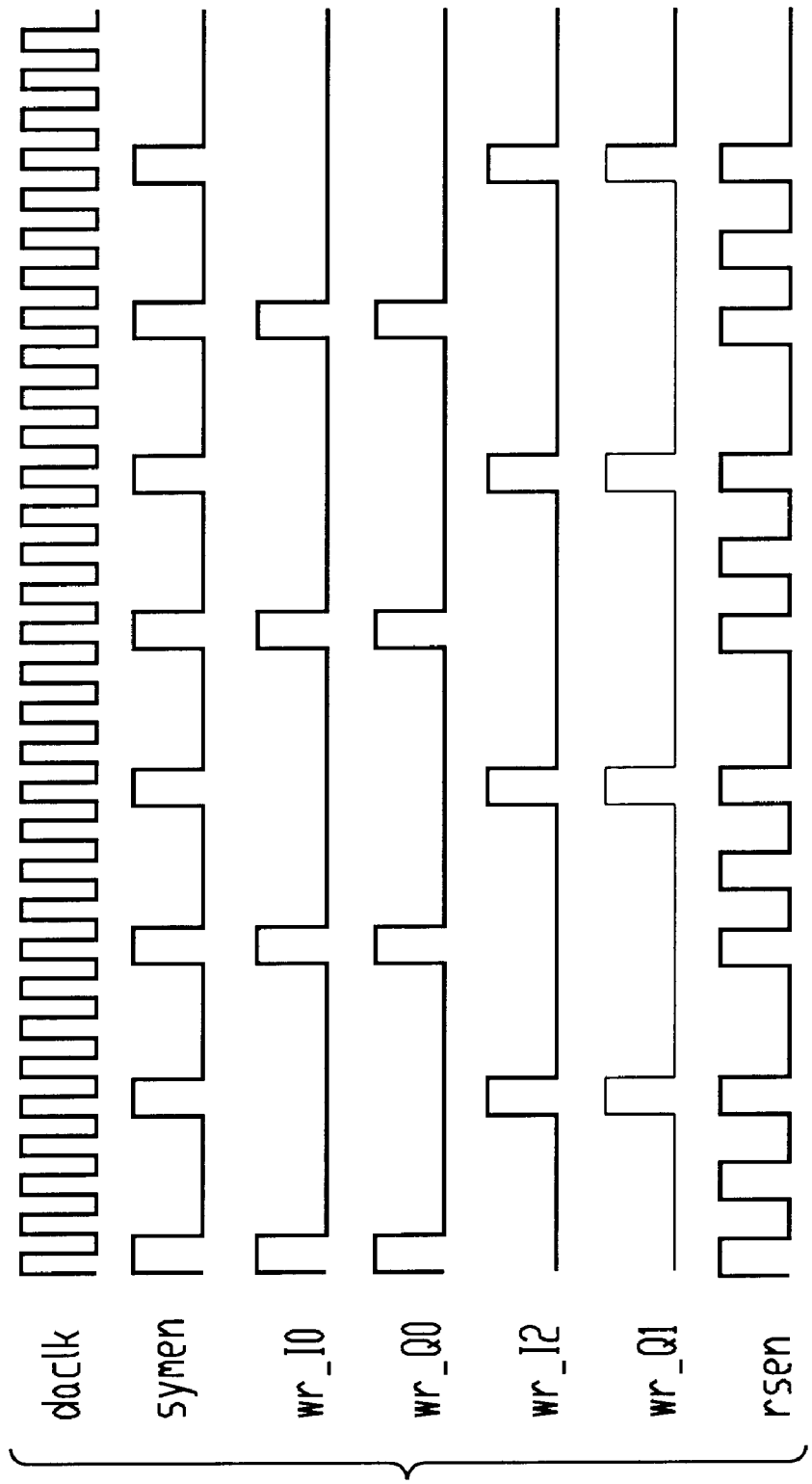

FIG. 8b is a timing diagram of the depuncturer/carrier identifier module of FIG. 8a. The operation of the depuncturing logic 801 and the carrier identifier logic 809 is based upon a master clock signal from an A/D converter (not shown)—i.e., adclk. The diagram shows the relationship between the following signals: symen (symbol enable), wr_I0 (I0 write enable), wr_Q0 (Q0 write enable), wr I2 (I2 write enable), wr_Q1 (I1 write enable), and rsen (shift load enable).

Figure 9:
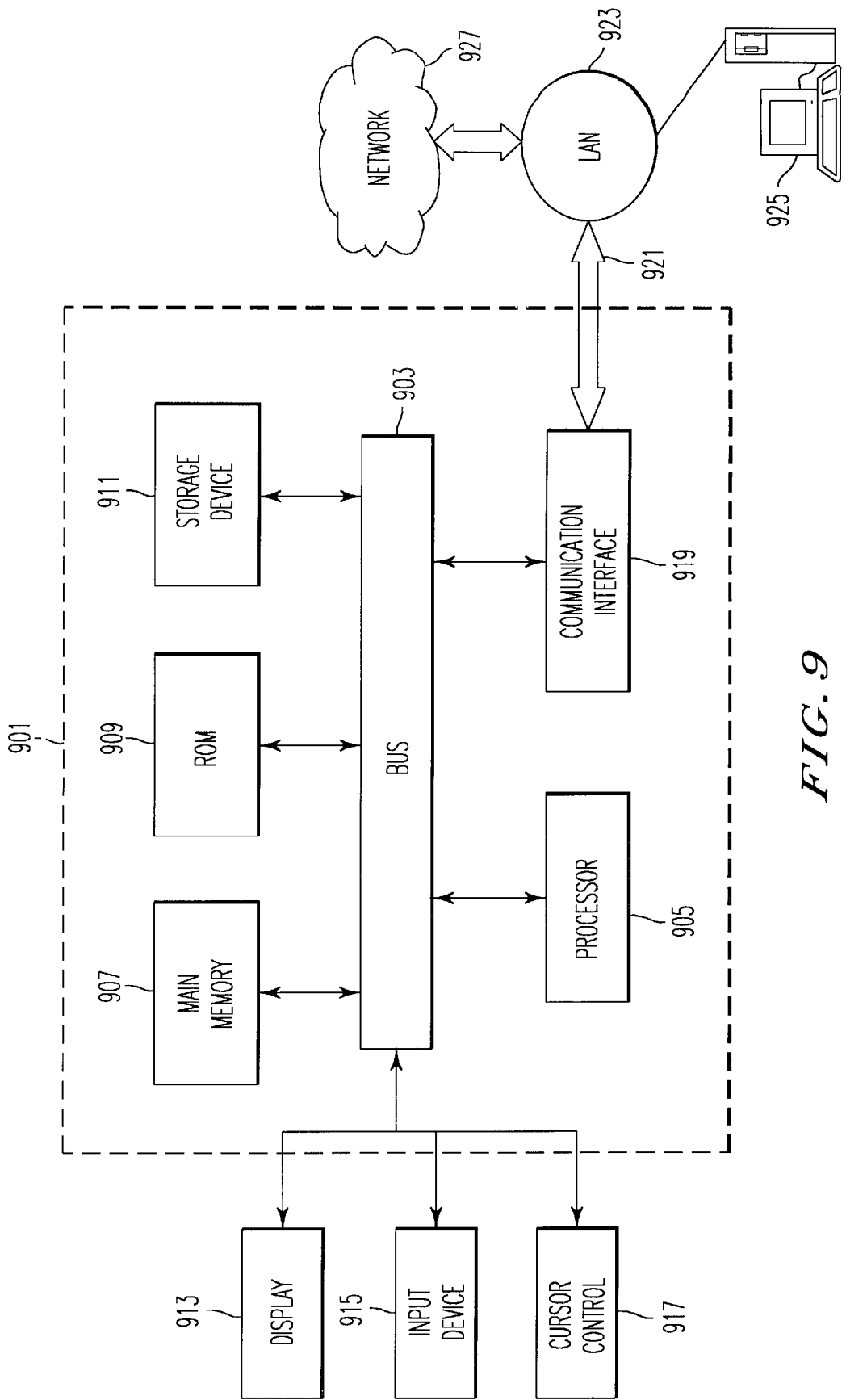
FIG. 9 is a diagram of a computer system that can generate the water-marking sequence, in accordance with an embodiment of the present invention.

FIG. 9 illustrates a computer system 901 upon which an embodiment according to the present invention may be implemented to identify carriers using watermarking sequences. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, the watermarking sequences are generated by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hard-wired circuitry may be used in place of or in combination with software instructions. Thus, embodiments are not limited to any specific combination of hardware circuitry and software.

Further, the watermarking sequence generation procedure may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to identifying a particular carrier among a plurality of carriers. A transmitter multiplies an encoded signal by a prescribed periodic sequence (i.e., watermarking sequence) to form a watermarked signal and transmits the watermarked signal associated with a particular carrier over a communication channel. A receiver tunes to one of the carriers and extracts a data sequence from the one carrier. The receiver multiplies the data sequence with the prescribed periodic sequence to form another watermarked signal and determines whether the watermarked signals match. A match signifies an identification of the specific carrier. The present invention advantageously avoids the need to utilize additional bandwidth, and minimizes hardware modification requirements of existing modem equipment.

Obviously, numerous modifications and variations of the present invention are possible in light of the above teachings. It is therefore to be understood that within the scope of the appended claims, the invention may be practiced otherwise than as specifically described herein.

What is claimed is:

1. A method for identifying a particular carrier among a plurality of carriers, the method comprising:
   multiplying an encoded signal by a prescribed periodic sequence to form a watermarked signal;
   transmitting the watermarked signal associated with the particular carrier over a communication channel;
   tuning to one of the carriers;
   extracting a data sequence from the one carrier;
   multiplying the data sequence with the prescribed periodic sequence to form another watermarked signal; and
   determining whether the watermarked signals match.

2. The method according to claim 1, further comprising:
   generating the prescribed periodic sequence, the generating step comprising, determining a bad sequence that produces a false detection, and determining a candidate sequence that is different from the bad sequence and that has a correlation with a plurality of circularly shifted sequences of the candidate sequence, the correlation being different from the bad sequence; and
   building a codebook from the determined candidate sequence.

3. The method according to claim 1, further comprising:
   encoding data bits using forward error control (FEC) coding to output the encoded signal;
   puncturing the encoded signal according to a puncturing scheme;
   synchronizing the prescribed periodic sequence with the puncturing scheme; and
   modulating the encoded signal.

4. The method according to claim 3, wherein the FEC coding in the step of encoding is at least one of Reed-Solomon coding and convolutional coding.

5. The method according to claim 1, further comprising:
   demodulating the watermarked signal;
   depuncturing the watermarked signal;
   decoding the watermarked signal;
   monitoring channel error rate based upon the decoding step; and
   selectively adjusting depuncturing and demodulation of the watermarked signal based upon the monitoring step.

6. The method according to claim 1, wherein the data sequence in the extracting step having a code rate that is identical to a code rate of the prescribed periodic sequence.

7. A transmitting device for generating a plurality of carriers, comprising:
   a forward error control (FEC) encoder configured to code data bits from a data terminal equipment (DTE) to output an encoded signal;
   a puncturing/carrier identification encoding logic configured to multiply the encoded signal by a prescribed periodic sequence to form a watermarked signal, to puncture the encoded signal according to a puncturing scheme, and to synchronize the prescribed periodic sequence with the puncturing scheme; and
   a modulator configured to modulate the watermarked signal.

8. The device according to claim 7, wherein the FEC encoder utilizes at least one of Reed-Solomon codes and convolutional codes.

9. The device according to claim 7, further comprising:
   a random access memory (RAM) coupled to the puncturing/carrier identification encoding logic and configured to store the prescribed periodic sequence.

10. The device according to claim 7, wherein the prescribed periodic sequence is stored in a codebook that contains a candidate sequence that has a correlation with a plurality of circularly shifted sequences of the candidate sequence, the bad sequence producing a false detection in a decoder and being different from the candidate sequence and the correlation.

11. A receiving device for receiving a plurality of carriers, comprising:
    a tuner configured to tune to one of the plurality of carriers;
    a demodulator configured to extract a data sequence from the one carrier;
    a carrier identification (ID) module configured to multiply the data sequence with a prescribed periodic sequence to form a watermarked signal, the carrier ID module providing a feedback signal to the tuner to control selection of the plurality of carriers; and
    a forward error control (FEC) decoder configured to decode selectively the watermarked signal;
    wherein the carrier ID module comprises:
      a depuncturer/carrier identifier logic configured to depuncture the watermarked signal;
      a FEC finite state machine coupled to the depuncturer/carrier identifier logic and configured to adjust depuncturing phase of the watermarked signal; and
      a channel error monitor module coupled to the decoder and configured to determine whether a channel error rate associated with the received watermarked signal exceeds a predetermined error threshold, the channel error monitor module selectively outputting an out-of-synchronization signal to the FEC finite state machine based upon the determined channel error rate.

12. The device according to claim 11, wherein the demodulator utilizes QPSK (Quadrature Phase Shift Keying), the device further comprising:
    an I/Q swapper and inverter logic coupled to the FEC finite state machine and configured to control the demodulator based upon a control signal from the FEC finite state machine.

13. The device according to claim 11, further comprising:
    a random access memory (RAM) coupled to the depuncturer/carrier identifier logic and configured to store the prescribed periodic sequence.

14. A receiving device for receiving a plurality of carriers, comprising:
    a tuner configured to tune to one of the plurality of carriers;
    a demodulator configured to extract a data sequence from the one carrier;

a carrier identification (ID) module configured to multiply the data sequence with a prescribed periodic sequence to form a watermarked signal, the carrier ID module providing a feedback signal to the tuner to control selection of the plurality of carriers; and a forward error control (FEC) decoder configured to decode selectively the watermarked signal;

wherein the prescribed periodic sequence is stored in a codebook that contains a candidate sequence that has a correlation with a plurality of circularly shifted sequences of the candidate sequence, the bad sequence producing a false detection in the decoder and being different from the candidate sequence and the correlation.

15. A communication system utilizing a plurality of carriers in a continuous-mode modem, comprising:

a transmitter configured to multiply an encoded signal by a prescribed periodic sequence to form a watermarked signal and to transmit the watermarked signal associated with a particular carrier over a communication channel; and a receiver configured to tune to one of the carriers and to extract a data sequence from the one carrier, the receiver multiplying the data sequence with the prescribed periodic sequence to form another watermarked signal and determining whether the watermarked signals match.

16. The system according to claim 15, wherein the transmitter comprises:

a forward error control (FEC) encoder configured to encode data bits to output the encoded signal;

puncturing/carrier identification encoding logic configured to puncture the encoded signal according to a puncturing scheme and to synchronize the prescribed periodic sequence with the puncturing scheme; and a modulator configured to modulate the encoded signal.

17. The system according to claim 16, wherein the FEC encoder utilizes at least one of Reed-Solomon coding and convolutional coding.

18. The system according to claim 16, wherein the receiver comprises:

a demodulator configured to demodulate the watermarked signal;

a carrier identification (ID) module configured to depuncture the watermarked signal;

a decoder configured to decode the watermarked signal;

a channel error monitor module coupled to the decoder and configured to monitor channel error rate; and a FEC finite state machine configured to selectively adjust depuncturing and demodulation of the watermarked signal based upon the channel error rate.

19. The system according to claim 18, wherein the prescribed periodic sequence is stored in a codebook that contains a candidate sequence that has a correlation with a plurality of circularly shifted sequences of the candidate sequence, the bad sequence producing a false detection in the decoder and being different from the candidate sequence and the correlation.

20. The system according to claim 15, wherein the data sequence has a code rate that is identical to a code rate of the prescribed periodic sequence.

21. A system for identifying a particular carrier among a plurality of carriers, the system comprising:

means for multiplying an encoded signal by a prescribed periodic sequence to form a watermarked signal;

means for transmitting the watermarked signal associated with the particular carrier over a communication channel;

means for tuning to one of the carriers;

means for extracting a data sequence from the one carrier;

means for multiplying the data sequence with the prescribed periodic sequence to form another watermarked signal; and means for determining whether the watermarked signals match.

22. The system according to claim 21, further comprising:

means for encoding data bits using forward error control (FEC) coding to output the encoded signal;

means for puncturing the encoded signal according to a puncturing scheme;

means for synchronizing the prescribed periodic sequence with the puncturing scheme; and means for modulating the encoded signal.

23. The system according to claim 22, wherein the FEC coding is at least one of Reed-Solomon coding and convolutional coding.

24. The system according to claim 21, further comprising:

means for demodulating the watermarked signal;

means for depuncturing the watermarked signal;

means for decoding the watermarked signal;

means for monitoring channel error rate based upon the decoded watermarked signal; and means for selectively adjusting depuncturing and demodulation of the watermarked signal based upon the channel error rate.

25. The system according to claim 21, further comprising:

means for generating the prescribed periodic sequence, the generating means comprising, means for determining a bad sequence that produces a false detection, and means for determining a candidate sequence that is different from the bad sequence and that has a correlation with a plurality of circularly shifted sequences of the candidate sequence, the correlation being different from the bad sequence; and means for building a codebook from the determined candidate sequence.

26. A computer-readable medium carrying one or more sequences of one or more instructions for receiving a plurality of carriers, the one or more sequences of one or more instructions including instructions which, when executed by one or more processors, cause the one or more processors to perform the steps of:

tuning to one of the plurality of carriers;

extracting a data sequence from the one carrier;

multiplying the data sequence with a prescribed periodic sequence to form a watermarked signal; and selectively decoding the watermarked signal;

wherein the one or more processors further perform the steps of:

depuncturing the watermarked signal;

selectively adjusting depuncturing phase of the watermarked signal; and determining whether a channel error rate associated with the received watermarked signal exceeds a predetermined error threshold;

selectively outputting an out-of-synchronization signal to a FEC finite state machine based upon the determining step.

27. A computer-readable medium carrying one or more sequences of one or more instructions for receiving a plurality of carriers, the one or more sequences of one or more instructions including instructions which, when executed by one or more processors, cause the one or more processors to perform the steps of:
   tuning to one of the plurality of carriers;
   extracting a data sequence from the one carrier;
   multiplying the data sequence with a prescribed periodic sequence to form a watermarked signal; and
   selectively decoding the watermarked signal;
   wherein the one or more processors further perform the steps of:
   generating the prescribed periodic sequence, the generating step comprising, determining a bad sequence that produces a false detection, and determining a candidate sequence that is different from the bad sequence and that has a correlation with a plurality of circularly shifted sequences of the candidate sequence, the correlation being different from the bad sequence; and
   building a codebook from the determined candidate sequence.

* * * * *